United States Patent [19]

Whitney et al.

[11] 4,056,835
[45] Nov. 1, 1977

[54] HEAD SUPPORT AND EJECT MECHANISM FOR RECORDING AND/OR PLAYBACK APPARATUS

[75] Inventors: James C. Whitney, Fairfield; Anthony Ciaraldi, Stamford, both of Conn.

[73] Assignee: Dictaphone Corporation, Rye, N.Y.

[21] Appl. No.: 678,596

[22] Filed: Apr. 20, 1976

[51] Int. Cl.² .................... G11B 21/22; G11B 15/04; G11B 5/12

[52] U.S. Cl. ...................... 360/105; 360/60; 360/118

[58] Field of Search .............. 360/105, 96, 60, 118

[56] References Cited

U.S. PATENT DOCUMENTS

| | | | |
|---|---|---|---|
| 3,768,814 | 10/1973 | Sato | 360/105 |
| 3,781,016 | 12/1973 | Benton et al. | 360/105 |
| 3,800,327 | 3/1974 | Okita et al. | 360/105 |
| 3,833,922 | 9/1974 | De Bell et al. | 360/105 |
| 3,959,821 | 5/1976 | Nardino | 360/105 |

*Primary Examiner*—Robert S. Tupper
*Attorney, Agent, or Firm*—Arthur V. Smith

[57] ABSTRACT

Head support apparatus for a recording and/or playback apparatus including a pivotable support member upon which the head is mounted. The support member is pivotally coupled to a pivot rod and pivots in a plane substantially normal to the movement of tape past the record and/or playback head with the pivotal movement of the support member controlled to selectively place the head in contact with the tape. In one embodiment, the tape is stored in a housing which is supported within the recording/playback apparatus, the tape and tape housing being loaded and unloaded with the assistance of a tray. A second support member adjacent the first-mentioned support member is pivotally coupled to the same pivot rod. A spring is coupled between the tray and the second support member to bias the tray toward a receiving position for receiving a tape housing and to bias the second support member toward the tray. A latching member on the second support member cooperates with a detent on the tray to releasably lock the tray in an operative position. An erase head is mounted on the second support member to be inserted into the tape housing when the tray is locked in its operative position.

18 Claims, 5 Drawing Figures

HEAD SUPPORT AND EJECT MECHANISM FOR RECORDING AND/OR PLAYBACK APPARATUS

BACKGROUND OF THE INVENTION

This invention relates to head support structure for use in a tape recording and/or playback apparatus and, more particularly, to such a structure wherein a record and/or playback head is pivoted into and out of contact with the tape through an arc which lies in a direction normal to tape movement.

In general, in tape recording and/or playback devices of the type which operates upon tape stored in a housing, or cartridge, various components of the device are inserted into the housing to operatively contact the tape therein. For this purpose, the tape housing is provided with suitable openings through which the components, such as a record and/or playback head and an erase head, are inserted. In some tapes cartridges, such as in the so-called tape cassette, a pressure roller also is inserted through an opening to cooperate with a capstan for driving the tape. Typically, in certain operations, such as fast-forward and rewind operations, the record and/or playback head and the pressure roller are moved away from the tape, and even withdrawn from the cassette. Also, when the cassette is inserted into or removed from the record and/or playback device, these components should be particularly positioned so as not to interfere with the cassette.

In many recording and/or playback devices now available, the foregoing requirements on the operating components such as the record and/or playback head, the erase head and the pressure roller, are satisfied by mounting these components on a slidable support. Unfortunately, it has been found that such typical slidable supports are of rather complex structure and, moreover, demand significant space requirements in the overall device for accommodating the total forward and backward longitudinal movement of the mounted components. Also, in some devices, individually actuable supports are provided for the record and/or playback head and the pressure roller. This adds to the bulk and cost of the device.

In other recording and/or playback devices now available, the various operative components are mounted on a support which is pivoted into and out of the cassette along an arc parallel to the direction of tape movement. This support requires that the pivot point be laterally spaced to the side of the cassette and suffers from the undesirable aspect of excessive space requirements in order to provide the necessary pivot radius for each component. Furthermore, this type of mechanism often demands a smaller range of mechanical tolerances for the components. Additionally, some of these support mechanisms, as well as some of the slidable support mechanisms, encounter difficulty in accurately positioning the heads in proper alignment with the recording tape.

Another disadvantage of many recording and/or playback devices now available is that the eject mechanism for removing a cartridge from the device is a separate mechanism. That is, it is not integrated with other machine components and, consequently, requires separate manufacturing and assembly steps in the production of the overall device.

OBJECTS OF THE INVENTION

Therefore, it is an object of the present invention to provide improved support apparatus for the various operative components of a tape recording and/or playback apparatus.

Another object of this invention is to provide an improved support apparatus for a record and/or playback head in a tape recording and/or playback apparatus which requires minimum space for moving the head into and out of contact with the tape.

Still another object of this invention is to provide improved support apparatus for various operative components in a recording and/or playback apparatus which is of simple construction and which pivots these components into operative relation with the tape under the control of a simple mechanism, resulting in apparatus of low mass and few moving parts.

Yet another object of this invention is to provide improved support apparatus for both a playback and/or recording head and a pressure roller for use in a tape recording and/or playback apparatus.

A still further object of this invention is to provide head support apparatus for use in a tape recording and/or playback apparatus of the type which accommodates a tape cassette, the head support apparatus being pivotable from beneath the cassette and moving in an arc which is normal to the direction of movement of the tape.

An additional object of this invention is to provide an improved head support structure for a cassette-type tape recording and/or playback apparatus wherein the cassette eject mechanism is integrally provided with the head support structure.

Yet a further object of the present invention is to provide improved head support structure for use in a cassette-type tape recording and/or playback apparatus, the support structure being formed of few parts to position the head in proper alignment with the tape within the cassette while requiring only a small number of elements to have a limited range of tolerances.

Various other objects and advantages of the present invention will become apparent from the ensuing detailed description, and the novel features will be particularly pointed out in the appended claims.

SUMMARY OF THE INVENTION

In accordance with the present invention, head support apparatus for use in a tape recording and/or playback apparatus is provided to include a pivotable support member upon which a record and/or playback head is mounted with the pivotable support member being pivotably coupled to a pivot rod to pivot the head in a plane substantially normal to the movement of the tape. A control mechanism selectively pivots the support member toward and away from the tape.

In a preferred embodiment, a record and/or playback head is disposed on the support member and an erase head is disposed on a second support member pivotable about the same pivot rod. The second support member is provided with a releasable latching member for latching a tray included in the recording and/or playback apparatus for assisting in the loading and unloading of a tape cassette in the apparatus.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

Figure 1:
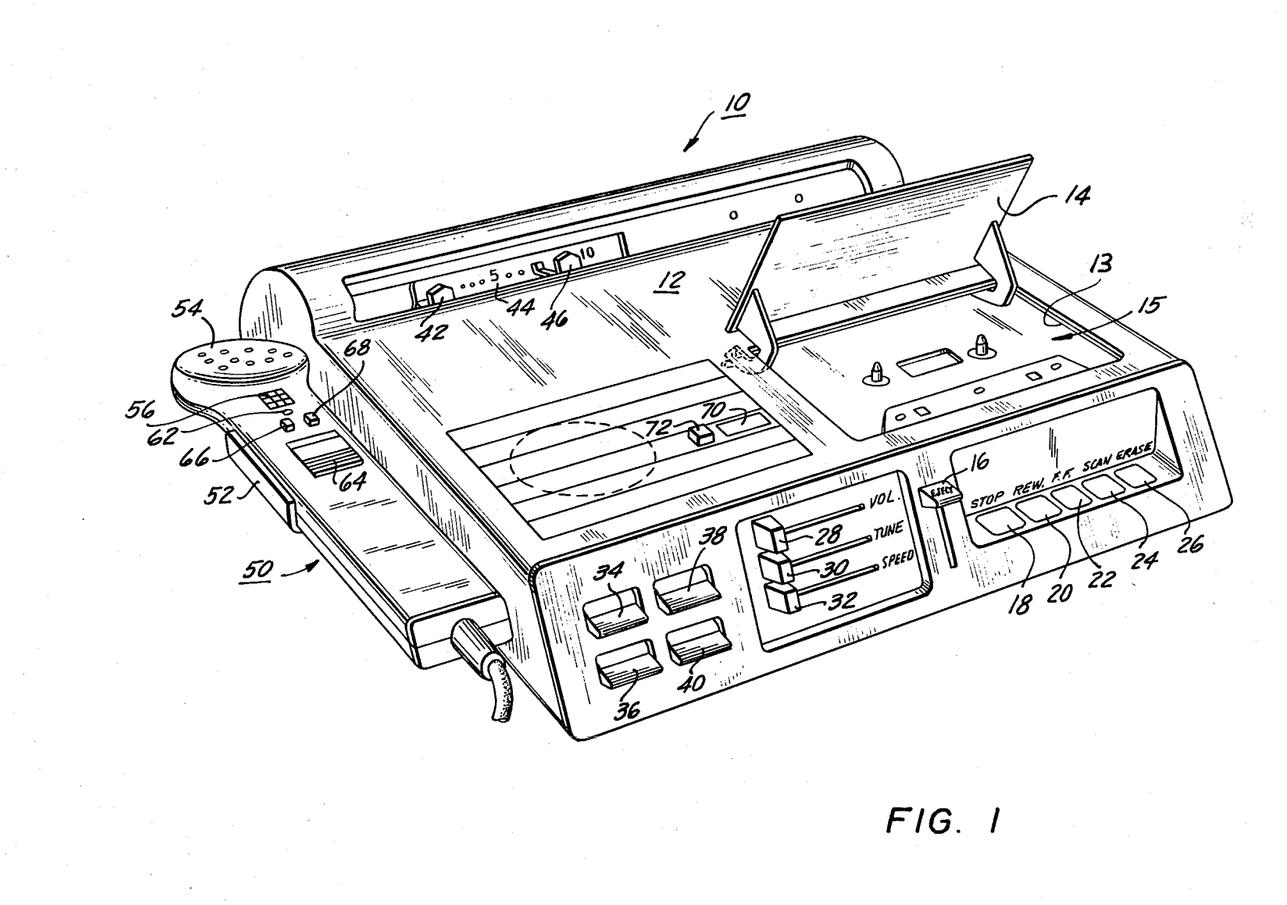
FIG. 1 is a perspective view of recording and/or playback apparatus with which the present invention can be used.

Referring now to the drawings, wherein like reference numerals are used throughout, FIG. 1 illustrates one preferred embodiment of a magnetic tape recording and/or playback apparatus 10 in which the present invention finds ready application. Preferably, the illustrated apparatus is a dictation machine of a type which uses tape stored in a housing, such as the conventional magnetic tape cassette. The cassette housing is provided with various apertures to accommodate reel drive spindles to drivingly engage supply and take-up reels within the housing, and to accommodate a record/playback transducer, or head, which is inserted into contact with the tape. As is conventional, additional apertures are provided to receive an erase head and a pressure roller, the latter cooperating with a capstan for moving the tape past the various heads. In order to accommodate such a tape cassette, dictation apparatus 10 is provided with a cassette holder compartment 13 into which a tape cassette 15 is inserted. As will be shown in greater detail below, cassette holder compartment 13 is provided with a tray to assist in the loading and unloading of the tape cassette, various guide mechanisms for the cassette housing and a door 14 which is pivotable between an open position to permit insertion of the tape cassette and a closed position to shield the cassette and the machine elements during operation.

Various operator-actuated elements, or control switching devices, are provided to effect dictation and/or playback operations. Typical of these operator-controlled elements is an eject control 16 which, when actuated, serves to lift the cassette tray from its operative position to a cassette receiving (or removal) position, thus opening door 14 to permit a cassette to be received or removed. A series of control elements or switches, such as push-buttons or touch-sensitive devices, is provided for an operator to selectively control various machine operations. To this end, a stop control 18 is provided to terminate the operation of the dictation apparatus 10 and to place the apparatus in a quiescent mode. When stop control 18 is actuated, tape movement is arrested and the record/playback head is withdrawn from tape contact. When placed in this mode, dictation apparatus 10 is ready for subsequent placement in another operating mode.

The series of control elements also includes a rewind control 20 for rewinding the tape from its take-up reel within the cassette housing to its supply reel as well as a fast-forward control 22 to rapidly move the tape from its supply reel to its take-up reel. In addition, a scan control 24 electronically scans the moving tape for the presence of predetermined control signals thereon while the tape moves in its rewind direction. As described in greater detail in copending application Ser. No. 678,697, filed Apr. 20, 1976 these control signals represent various instructions which are useful in guiding a transcriptionist during a transcribe operation. Hence, when actuated, the scan control 24 causes appropriate control apparatus to detect and indicate the relative locations of such control signals.

An erase control 26 is provided for erasing information previously recorded on the magnetic tape. In general, this erase function is performed while the tape is transported between its supply and take-up reels.

Another series of operator-actuated controls is provided to enable an operator to selectively control the audio characteristics of reproduced information. To this effect, a volume control 28, a tone control 30 and a tape-speed control 32 are provided to perform the respective indicated functions.

Yet another series of operator-actuated controls is provided, including an on/off switch 34, a speaker control switch 36 and a conference/dictate switch 38. The illustrated dictation apparatus 10 is provided with a loudspeaker and, additionally, a microphone assembly 50 which is used with this dictation apparatus is also provided with a loudspeaker. Accordingly, the speaker control switch 36 permits an operator to selectively actuate the loudspeaker of dictation apparatus 10 or the loudspeaker of microphone assembly 50 for the reproduction of sound, as desired. Conference/dictate control switch 38 is provided to selectively enable an operator of dictation apparatus 10 to use this apparatus for normal dictation or, alternatively, to record a conference. In the latter mode, the amplification gain of the recording circuits is increased.

An optional telephone control switch 40 is provided to selectively enable an operator to use dictation apparatus 10 to record information directly from a telephone line.

Control indicators 42 are provided at the rear of dictation apparatus 10 and include various indicators, such as light sources, for apprising an operator of the condition of the machine. Positioned adjacent the control indicators 42 is a slide index 44 including a scale and a movable slide lever 46 which traverses the scale. Slide lever 46 moves in synchronism with the movement of the cassette tape so as to indicate to the operator his present position in respect to the full length of the tape.

Microphone assembly 50 is electrically connected to the control electronics included in dictation apparatus 10. For convenience, microphone assembly 50 is supported on a microphone support bracket 52 which may be coupled to the machine housing 12. Microphone assembly 50 includes a sound transducer 54 for converting audio information into corresponding electrical signals, and the loudspeaker 56, described above. In addition, various operator-controlled actuating elements 62, 64, 66 and 68 are provided to enable an operator to control a dictation operation merely by the selective operation of the indicated elements. These elements include a dictate control switch which, when actuated, energizes corresponding components in dictation apparatus 10 to permit information to be recorded on the magnetic tape; a rewind control switch for high speed rewind of tape; a dictate indicator to apprise an operator of the operating mode in which dictation apparatus 10 is conditioned; a foward/stop control switch to transport tape from the supply reel to the take-up reel; and a fast-forward switch for the fast-forward movement of tape. In addition, one or more instruction switches are provided, and these switches, when actuated, place predetermined control signals on the tape, indicating that succeeding information is intended to be an instruction, or that the end of a selected piece of dictation has been reached. It is these control signals which are detected in response to the actuation of the scan control 24.

As shown in FIG. 1, dictation apparatus 10 is provided with a tape footage counter 70, which may be a conventional digital counter representing the amount of tape which has been transported, and a reset control 72 adapted to reset the count displayed by the counter 70 to a reference, or zero, indication.

The functions of the aforementioned operator-control elements are self-evident. Accordingly, in the interest of brevity, further description thereof is not provided.

Figure 2:
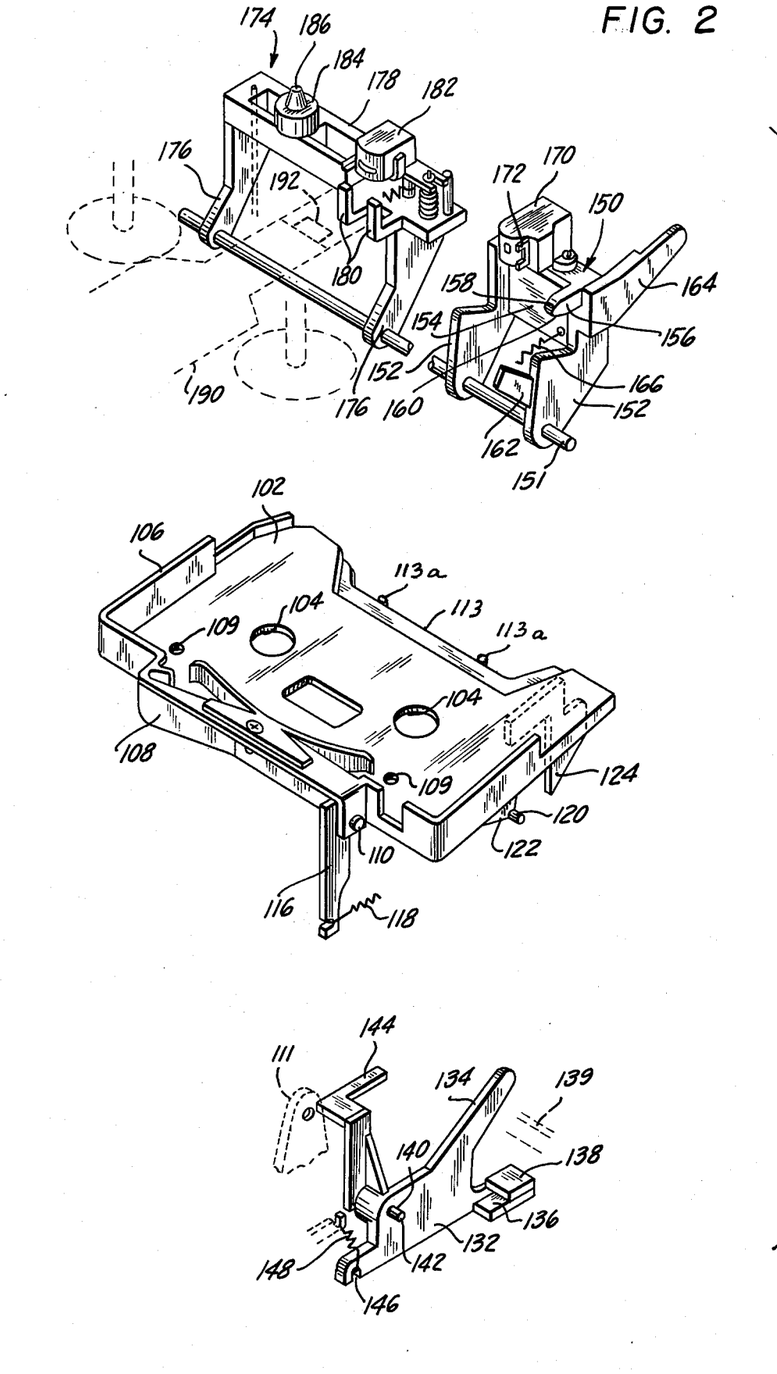
FIG. 2 is an exploded perspective view of the head support structure and eject mechanism of the present invention.

The cassette loading tray provided in cassette holder compartment 13 and the support structure for the heads which cooperate with the magnetic tape housed in the cassette now will be described with reference to the exploded perspective view of FIG. 2 and the top plan view of FIG. 4. Cassette tray 102 is a suitable platform provided with various apertures 104 and a peripheral wall 106 for suitably supporting a tape cassette during loading and unloading operation. Apertures 104 serve to permit drive spindles (such as drive spindles 212 and 222 in FIG. 4) to drivingly engage the respective supply and take-up reels in the cassette housing. Apertures 109 permit stops 109a on the chassis (FIG. 4) to contact the rear portion of cassette 15 so as to properly position the cassette for a recording and/or playback operation. Stops 113a on the chassis project through cut-out portion 113 of tray 102 to contact and thus supportably position the front portion of cassette 15 in proper alignment with the recording/playback head 182, erase head 170 and pressure roller 184. A rear portion 108 of peripheral wall 106 is provided with pins 110 extending therefrom and adapted to be journalled for rotation in bearing members 111 provided on the chassis. Hence, tray 102 is pivotable about the axis defined by pins 110.

A leaf spring 112 is secured to tray 102 to exert a bias force on cassette 15 when placed on the tray. This bias force urges the cassette in a generally forward direction, in respect of the dictation apparatus, to assure good contact between the tape and the various operative components (e.g., the heads and pressure roller). In the interest of consistency, a forward direction, as used herein, means in the direction toward the front portion of the dictation apparatus. As will become apparent, the heads and pressure roller are disposed in the front portion of dictation apparatus 10 and, therefore, forward direction of cassette 15 means in a direction toward the heads. Similarly, rearward direction, as used herein, means in a direction toward the rear portion of apparatus 10. Nevertheless, these expressions are intended merely to aid the description of the particular embodiment illustrated herein, and are not intended to limit the present invention solely to such forward and rearward directions.

Peripheral wall 106 of tray 102 is provided with a cut-out 114 through which a tab sensor 144 passes to detect the presence of the conventional knock-out tab on the rear portion of cassette 15. As is understood, the presence or absence of such a tab dictates whether information can be recorded on the tape.

A leg 116 is provided on rear portion 108 of peripheral wall 106. As shown, leg 116 depends from tray 102. If desired, leg 116 may be provided on any other portion of peripheral wall 106, or may depend from the base of tray 102. A spring 118 extends from leg 116 to an eject mechanism, to be described, for exerting a bias force on tray 102 to urge tray 102 in the counterclockwise direction, as viewed in FIG. 2.

A pin 120 provided on a pin support 122 depending from tray 102 serves to limit the counterclockwise movement of the tray, as will be described.

Figure 3A:
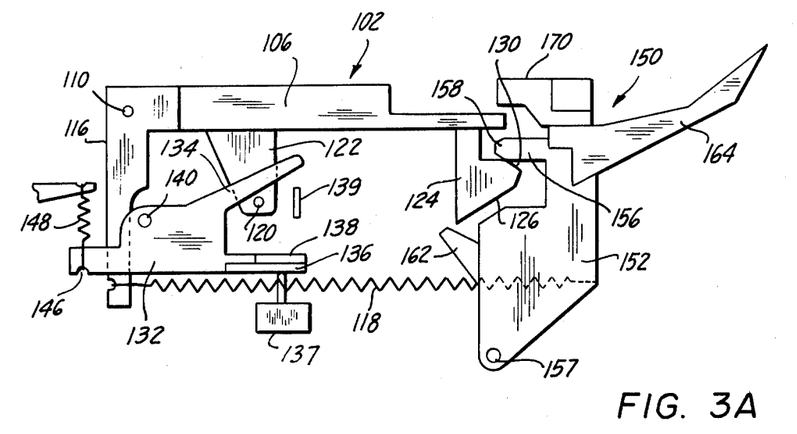
FIGS. 3A and 3B are side plan views of the eject mechanism shown in FIG. 2.
Figure 3B:
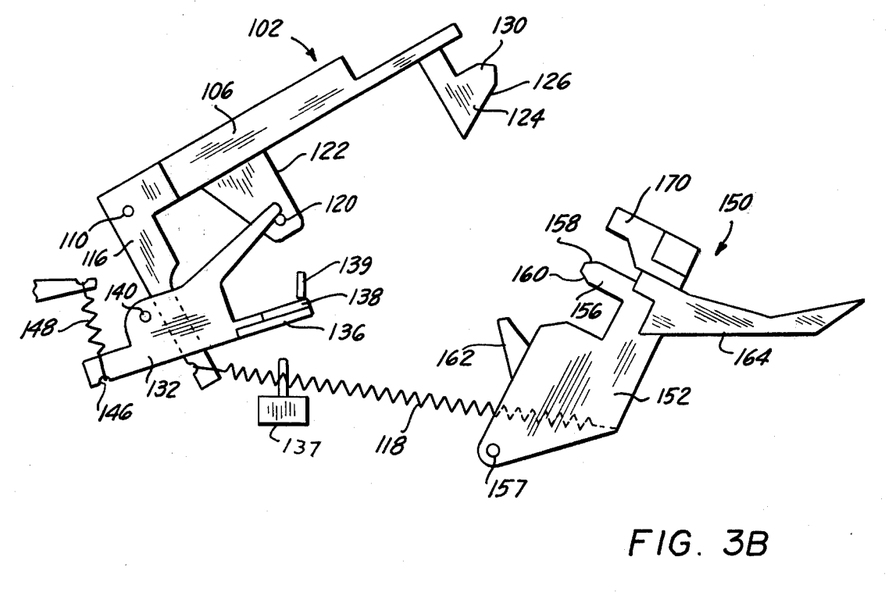

Depending from tray 102 is a detent member 124 provided to cooperate with a latching member, to be described, to lock tray 102 in an operative position. As shown in FIGS. 3A and 3B, detent member 124 has adjacent cammed surfaces 126 and 130 which permit tray 102 to move the latching member away from the tray when pivoted to its operative position, and also permit release of detent member 124 from the latching member.

The support structure for the record and/or playback head and for the pressure roller includes a bridge member 174 having depending legs 176 journalled for rotation about a pivot rod 151. Suitable restraining members, not shown, restrain lateral movement of bridge member 174 along the axis of pivot rod 151. A crosspiece 178 is provided on the upper portion of bridge member 174 to serve as a support for record and/or playback head 182 and for pressure roller 184 and suitable mounting brackets secure head 182 to cross-piece 178. Also mounted on bridge member 174 is a pressure roller 184 journalled for rotation about a shaft 186 extending upwardly from crosspiece 178.

As shown, head 182 and pressure roller 184 are simultaneously pivoted into and out of contact with the tape housed within cassette 15, precluding the necessity for a separate mechanism for the independent control of the pressure roller. Another advantage is that head 182 and pressure roller 184 are pivoted into selective contact with the tape along an arc defined by legs 176. These legs can be considered to be the radius of the arcuate movement of head 182 and pressure roller 184. Thus, movement of head 182 and pressure roller 184 is within a plane which is substantially normal to the direction of movement of tape past head 182. Since the pivot radius for bridge member 174 extends from beneath cassette 15 when the cassette is in its operative position, the requisite space for accommodating this pivot movement is minimized. As yet another advantage, bridge member 174 can be molded or stamped as a unitary construction. Hence, it is relatively simple and inexpensive to manufacture. Also, since the number of moving parts for selectively positioning head 182 and pressure roller 184 is minimized, the problems of tolerances, fit and cooperation among respective parts are avoided. Only the tolerance between pivot rod 151 and the bearings provided in legs 176 affect the alignment of head 182 and pressure roller 184 with respect to the tape.

Preferably, head 182 and pressure roller 184 are pivoted into contact with the tape during record and playback operations, and are pivoted away from the tape during all other operative conditions and during the quiescent condition of dictation apparatus 10. To this effect, L-shaped legs 180 extend from cross-piece 178 and are contacted by the shoulders formed on the end portion of link member 190. As shown, a tongue 192 on link member 190 is inserted between legs 180. Link member 190 is longitudinally movable under the control of a solenoid 198. Hence, the other end of link member 190 is coupled to a solenoid armature 196. Thus, link member 190 is longitudinally movable in a forward and rearward direction. When moved rearwardly, the shoulders on link member 190 push legs 180 to pivot bridge member 174 in a clockwise direction. Conversely, when link member 190 is moved rearwardly, a spring 194 (FIG. 4) coupled between the link member and bridge member 174 pulls the bridge member to pivot it in a counterclockwise direction. Hence, rearward movement of link member 190 pivots head 182 and pressure roller 184 into contact with the tape. Link member 190 performs additional functions, as will be briefly described hereinbelow.

The eject mechanism for pivoting tray 102 to its cassette receiving (or removal) position now will be described. A pivotable member 132 (FIGS. 2 and 3) is provided with a bore 140 to receive a shaft 142 mounted on the chassis. Shaft 142 defines a pivot axis for pivotable member 132. A let 134 extends upwardly and at an angle from pivotable member 132 to overlie pin 120 provided on pin support 122 of tray 102. Also, a pad mounting leg 136 extends from pivotable member 132 for mounting a pad 138 which contacts a frame member 139 provided on the chassis of dictation apparatus 10 to absorb the shock caused by sudden contact therebetween. As an alternative, pad 138 may be mounted on the frame itself. A spring 148 coupled between a notch 146 on pivotable member 132 and the chassis tends to bias pivotable member 132 in the clockwise direction, as seen in FIGS. 2 and 3, to urge leg 134 toward pin 120.

In one embodiment thereof, a tab sensor 144 is coupled to, or integrally formed with, pivotable member 132. Tab sensor 144 passes through cut-out 144 to detect the presence of a cassette knock-out tab. As will be described, pivotal movement of member 132 in the counterclockwise direction (as viewed in FIGS. 2 and 3) effectively moves tab sensor 144 rearwardly in tray 102. This clears tab sensor 144 from interfering with a cassette placed onto or removed from tray 102. Pivotal movement of member 132 in the clockwise direction urges tab sensor 144 toward the knock-out tab on a loaded cassette.

The cooperation between pivotable member 132 and tray 102 is shown in FIGS. 3A and 3B. FIG. 3A represents the operative position of tray 102. In this position, spring 148 urges pivotable member 132 in the clockwise direction so that leg 136 tends to abut against a microswitch 137. As shown, pad 138 is spaced from frame member 139. Microswitch 137, when actuated, is adapted to energize suitable electronic control circuitry (not shown) to prevent the erasure and/or subsequent recording of information on the cassette tape. This preventive feature occurs when a cassette knock-out tab is removed and tab sensor 144 enters the cassette housing. This permits member 132 to sufficiently pivot and abut leg 136 against microswitch 137 to actuate the microswitch. However, if the knock-out tab is present on the cassette housing, tab sensor 144 cannot enter the cassette housing and member 132 is blocked from pivoting sufficiently to abut leg 136 against microswitch 137.

When tray 102 is released and pivots to its cassette receiving (or removal) position, as shown in FIG. 3B, pin 120 rotates about the pivot axis defined by pin 110 to contact leg 134 and pivot member 132 in the counterclockwise direction about its pivot axis, defined by shaft 142. As tray 102 and member 132 pivot, pin 120 rides upwardly along leg 134. Spring 148 maintains a bias force on member 132 to assure positive abutment of leg 134 against pin 120.

Frame member 139 is disposed in the rotary path of pad mounting leg 136. Consequently, when pivotable member 132 rotates to the position where pad 138 abuts against frame member 139, further rotation of member 132 is prevented. Accordingly, leg 134 acts as a stop for pin 120 to limit further rotation of pin 120 and further pivotal movement of tray 102. Thus, maximum rotation of tray 102 is determined by the permitted movement of pivotable member 132 which, in turn, is a function of the spacing between pad 138 and frame member 139.

The latching mechanism which cooperates with detent member 124 to form a releasable locking device includes a bridge member 150 having depending legs 152 pivotably coupled to pivot rod 151. A latching member 156 is coupled to, or integrally formed with, bridge member 150 and includes upper and lower cammed faces 158, 160, respectively, as viewed in FIGS. 2 and 3. A lever 164 is secured to bridge member 150 and extends from dictation apparatus 10 to terminate in eject control 16. Spring 118, which is coupled at one end to leg 116 of tray 102, is coupled at its other end to bridge member 150. Consequently, spring 118 biases tray 102 toward its cassette receiving (or removal) position while simultaneously biasing bridge member 150 in the counterclockwise direction (that is, toward tray 102).

In an alternative embodiment, bridge member 150 is omitted and the eject mechanism includes a single leg 152 pivotably coupled to pivot rod 151 and biased by spring 118 with single legs 152 including latching member 156 extending therefrom and lever 164. However, in the embodiment shown in FIGS. 2, 3 and 4, bridge member 150 preferably supports an erase head 170 mounted on a support crosspiece 154. Erase head 170 is conventional and includes a tape guide member 172 mounted thereon.

Referring now to FIG. 3A, tray 102 is locked in its operative position by the cooperation between latching member 156 and detent 124. Since spring 118 biases member 150 toward tray 102, latching member 156 blocks upward movement of detent member 124 so as to prevent tray 102 from pivoting.

When lever 164 is depressed, as by depressing eject control 16, the bias force exerted on bridge member 150 is overcome and bridge member 150 pivots in the clockwise direction. As bridge member 150 pivots, lower cammed face 160 of latching member 156 rides along cammed surface 130 of detent 124. When lower cammed face 160 clears cammed surface 130, the restraining force previously exerted on detent member 124 by latching member 156 is removed. Consequently, the bias force exerted on tray 102 by spring 118 pivots the tray counterclockwise to its cassette receiving (or removal) position. This position is defined by frame member 139 which is contacted by pad 138. While pivoting to this position (FIG. 3B), the front portion of tray 102 opens door 14. Preferably, door 14 is provided with a toggle spring (not shown) which pivots the door open when the threshold force determined by the toggle spring is exceeded by tray 102.

Once detent member 124 clears latching member 156, bridge member 150 is free to pivot in the counterclockwise direction under the force exerted by spring 118. Although not shown, a stop is provided to limit this pivoting movement of bridge member 150.

When a cassette is placed upon tray 102 and the tray is manually pivoted to its operative position, bridge member 150 must be moved away. This is achieved by cammed surface 126 on detent member 124 which contacts the upper cammed face 158 of latching member 156. In response to further movement of tray 102 toward its operative position, cammed surface 126 rides upon upper cammed face 158 and urges latching member 156 and, thus, bridge member 150 away from tray 102. This force exerted on bridge member 150 overcomes the bias provided by spring 118 to pivot bridge member 150 in the clockwise direction. When cammed surface 126 clears upper cammed face 158, latching member 156 is free to engage detent member 124. Hence, the bias exerted on bridge member 150 pivots the bridge member in the counterclockwise direction to lock detent member 124, as shown in FIG. 3A. Accordingly, tray 102 is locked in its operative position.

When a cassette 15 is loaded and supported on stops, or pins, 109a and 113a, erase head 170 is inserted into the cassette housing through an aperture in the housing. Since erase head 170 is mounted on bridge member 150, it is in proper alignment with the tape. As discussed hereinabove with reference to bridge member 174, the tolerance between pivot rod 158 and the bearing in legs 152 assures proper positioning of erase head 170 against the tape. As bridge member 150 is pivoted, erase head 170 is moved away from and into the cassette housing, to thereby permit cassette 15 to be ejected and to permit the performance of a recording operation, respectively.

Figure 4:
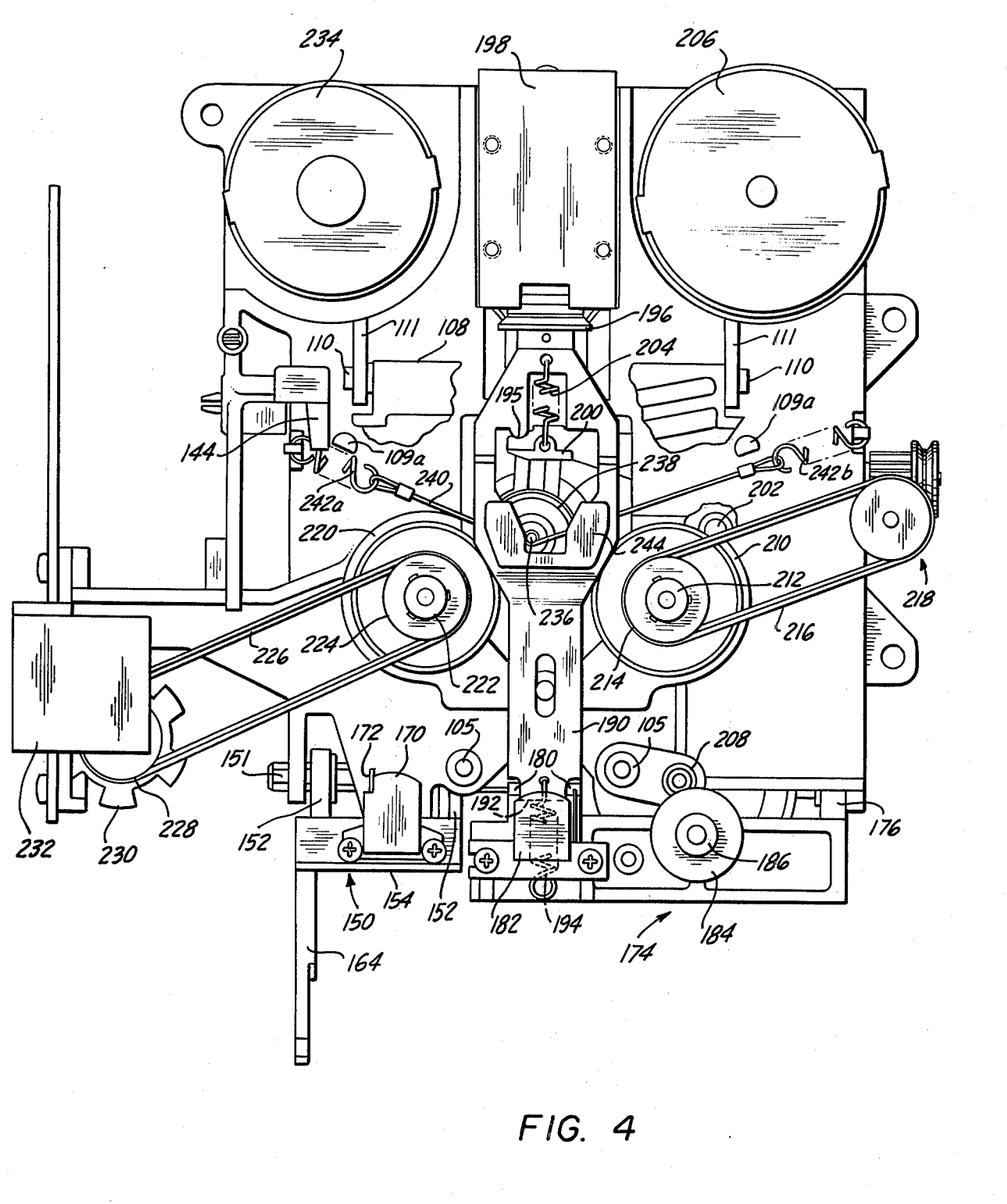
FIG. 4 is a top plan view of the head support structure in combination with typical components included in the recording and/or playback apparatus of FIG. 1.

As shown in FIG. 4, cassette guide pins 105 are provided on the chassis and are adapted to be inserted into suitable guide openings in cassette 15. The combination of the force exerted on cassette 15 by leaf spring 112 and guide pins 105 positions the cassette for recording and playback operations. Although unlikely, it is possible that, over prolonged use of dictation apparatus 10, the frictional forces on cassette 15 by guide pins 105, under the influence of leaf spring 112, exceed the bias force exerted on tray 102 by spring 118. Accordingly, tray 102 may not pivot when bridge member 150 is moved to release the tray. Nevertheless, the release of tray 102 is assured by a projecting member 162 extending from bridge member 150. Projecting member 162 may be coupled to leg 152 and abuts against detent member 124 when bridge member 150 is pivoted away from tray 102, thereby initiating upward movement of tray 102.

Although not necessary for a complete understanding of the present invention, the cooperation between the head support structure and eject mechanism and the tape transport apparatus used in dictation apparatus 10 now will be described with reference to FIG. 4. A relatively low speed unidirectional motor 206 is coupled to a take-up reel drive shaft 202 and to a capstan assembly 208. Take-up reel drive shaft 206 is adapted to selectively drive a take-up reel support member 210 which, in turn, drives a take-up spindle 212 and a pulley 214. Hence, motor 206 drives take-up spindle 212 so that tape is payed out from the supply reel in cassette 15 to the take-up reel. Pulley 214 is coupled by a drive belt 216 to a slide indicator drive 218, whereby lever 46 is moved past scale 44.

A higher speed bi-directional motor 234 is coupled to the drive shaft 236 of a drive roll 238. A string member 240 has its opposite ends secured by spring member 242a and 242b, respectively, to the chassis so as to tension string member 240. An intermediate portion of string member 240 is deployed by being wrapped about the upper end portion of drive shaft 236 to thus "capture" the drive shaft. Depending upon the direction in which drive roll 238 is driven by motor 234, the captured drive shaft 236 effectively "walks" along the string member to selectively urge drive roll 238 into contact with take-up reel support member 210 or with a supply reel support member 220. Supply reel support member 220 drives a supply reel spindle 222 which is adapted to engage the hub of the supply reel included in cassette 15. Hence, depending upon the selective energization of motor 234, drive roll 238 drives the tape in either a fast-forward or rewind direction.

A yoke member 244 is secured to link member 190 and includes a cut-out portion and a bifurcated end portion. Yoke 244 is moved by link 190 into one position which disposes drive shaft 236 in the cut-out portion to thereby constrain the lateral displacement of drive shaft 236, and into another position wherein yoke 244 is effectively cleared of drive shaft 236. When drive shaft 236 is disposed in the cut-out portion of yoke 244, drive roll 238 is prevented from driving either the take-up spindle 212 or the supply spindle 222.

Link member 190 is provided with an abutment 195 fixed so as to contact an actuator 200 of a pivoting crank arm (not shown) coupled to drive shaft 202. When link member 190 is moved forwardly, the crank arm is pivoted to move drive shaft 202 away from take-up reel support member 210. When link member 190 is moved rearwardly, a spring 204 coupled between link member 190 and pivoting crank arm actuator 200 pivots the crank arm to move drive shaft 202 against take-up reel support member 210.

When tray 102 is in its cassette receiving position, solenoid 198 is de-energized and link member 190 is in its forward-most position. Hence, bridge member 174 is pivoted away from tray 102 so as to permit the tray and cassette to be placed in the operative position. When tray 102 is placed in this operative position, bridge member 150 and, thus, erase head 170, are moved out of the path of tray 102 until the operative position is reached, and latching member 156 engages detent member 124.

If a record or playback mode is selected, solenoid 198 is energized to move link member 190 to its rearwardly-most position. This pivots bridge member 174 to move head 182 into contact with the tape in cassette 15 and, additionally, to urge pressure roller 184 against capstan 288 to move the tape. In addition, this rearward movement of link member 190 pivots drive shaft 202 into driving relation with take-up reel support member 210. As tape is moved past head 182 and wound onto the take-up reel, spindle 212 and pulley 214 rotate to drive slide indicator drive mechanism 218. Also, this tape movement rotates supply spindle 222 and pulley 224 to drive a pulley 228 which, in turn, rotates a chopper wheel 230 mounted below tape footage counter 232 which is also operatively incremented during rotation of drive pulley 278. If a record mode is selected, erase head 172, which is in contact with the tape, is energized to erase previously recorded information.

Rearward movement of link member 190 disposes drive shaft 236 in the cut-out portion of yoke member 244. When a fast-forward or rewind operation is selected, solenoid 198 is de-energized to move link member 190 to its forward-most position. This clears yoke 244 from drive shaft 236 and, additionally, pivots drive shaft 202 away from take-up reel support member 210. Depending upon the direction in which motor 234 is operated, drive shaft 236 is laterally displaced so that drive roll 238 drives take-up reel support member 210 in a fast-forward tape winding direction or supply reel support member 220 in a rewind direction. In addition to removing the lateral constraint on drive shaft 236, the forward movement of link member 190 pivots bridge member 174 away from tray 102 to remove head 182 and pressure roller 184 from cassette 15.

While the present invention has been particularly shown and described with reference to a preferred embodiment, it should be readily apparent that various changes and modifications in form and details can be made without departing from the spirit and scope of the invention. For example, the head support apparatus can be used with tape cassettes which do not use a tape-driving capstan. For such applications, pressure roller 184 can be omitted. Also, the head support structure can be used with conventional reel-to-reel transport systems, and need not be limited solely to use with tape cassettes. Therefore, it is intended that the appended claims be interpreted as including the foregoing as well as other such changes and modifications.

What is claimed is:

1. In a recording and/or playback apparatus of the type wherein information is recorded on and/or played back from magnetic tape driven past a record and/or playback head, support apparatus for said head, comprising a first pivotable support member upon which said head is mounted; means extending from said first support member for pivotally coupling said first support member to a pivot axis such that said first support member and said head are pivotable through an arc which lies in a plane substantially normal to the movement of said tape; means for controlling the pivotal movement of said first support member to selectively place said head in contact with said tape; a second pivotable support member disposed adjacent said first support member; an erase head mounted on said second support member to selectively contact said tape; means extending from said second support member to said pivot axis such that said second support member is pivotable through an arc which lies in a plane substantially normal to said movement of tape; and means for pivotally moving said second support member.

2. Support apparatus as defined by claim 1 wherein said recording and/or playback apparatus includes a capstan and further comprising a pressure roller mounted on said first support member and pivotable therewith into contact with said capstan, whereby said capstan and pressure roller drive said tape past said recording and/or playback head.

3. Support apparatus as defined by claim 1 wherein said first support member comprises a bridge member having a cross-piece upon which said record and/or playback head is mounted; and at least one leg depending from said cross-piece and pivotally coupled to a pivot rod.

4. Support apparatus as defined by claim 1 wherein said controlling means comprises a link member coupled at one end to said first support member and at its other end to a source of movement so as to move in one direction to pivot said first support member away from said tape and in an opposite direction to pivot said first support member toward said tape.

5. Support apparatus as defined by claim 4 wherein said source of movement consists of a selectively energizable solenoid.

6. Support apparatus as defined by claim 1 wherein said pivotally moving means comprises a manually depressible lever attached to said second support member for pivoting same away from said tape when manually depressed; and a spring coupled to said second support member for exerting a spring bias force thereon to urge same toward said tape.

7. In a recording and/or playback apparatus of the type wherein tape processing means including transducer means and tape drive means are provided for recording information on and/or playing information back from magnetic tape stored in a cartridge, apparatus comprising: a tray for receiving said cartridge, said tray being coupled to a first pivot axis to be pivotable between a receiving position and an operative position; bias means for biasing said tray toward said receiving position, said tray pivoting to said operative position in response to a force exerted thereon; and a pivotable support member upon which at least a portion of said tape processing means is mounted, said support member being pivotally coupled to a second pivot axis for moving said portion of said tape processing means in a plane substantially normal to the direction of tape movement to selectively insert said portion of said tape processing means into said cartridge, said pivotable support member having latching means thereon cooperable with said tray for releasably latching said tray in said operative position.

8. In a recording and/or playback apparatus of the type wherein information is recorded on and/or played back from magnetic tape stored in a housing and movable past a record and/or playback head insertable into said housing, apparatus comprising a tray pivotable about a first pivot axis in response to a force exerted thereon between a receiving position for receiving said housing and an operative position for disposing said housing in an operable position; a first support bridge having depending legs for pivotally supporting said bridge on a second pivot axis and a cross-member for supporting a record and/or playback head and a pinch roller; means for selectively pivoting said first bridge toward and away from said tray to selectively insert said record and/or playback head and said pinch roller into said tape housing when said housing is disposed in said operable position; a second support bridge adjacent said first bridge having depending legs for pivotally supporting said second bridge on said second pivot axis and a cross member for supporting an erase head; a spring coupled between said tray and said second bridge to bias said tray toward said receiving position and said second bridge toward said tray for inserting said erase head into said tape housing when said housing is disposed in said operable position; a latching member on said second bridge having upper and lower cam faces; a detent member on said tray having upper and lower cam faces, the lower cam face of said detent member riding on the upper cam face of said latching member as said tray is pivoted to its operative position to pivot said second bridge away from said tray until said detent member clears said latching member; and a manually depressible eject lever coupled to said second bridge for pivoting said second bridge away from said tray, said lower cam face of said latching member riding on said upper cam face of said detent member as said second bridge is pivoted away until said latching member clears said detent member.

9. In a recording and/or playback apparatus of the type wherein information is recorded on and/or played back from magnetic tape stored in a housing and movable past a record and/or playback head, apparatus comprising: a tray for receiving said tape housing, said tray being coupled to and pivotable about a first pivot axis between a receiving position and an operative position so as to dispose a received tape housing in a predetermined operable alignment; a pivotable support member upon which said head is mounted, said support member being pivotally coupled to a second pivot axis for moving said head in a plane substantially normal to the direction of tape movement to selectively place said head in contact with said tape when said tape housing is in said predetermined operable alignment; and latching means pivotally coupled to said second pivot axis for releasably latching said tray in said operative position.

10. Apparatus as defined by claim 9 wherein said latching means comprises at least one leg member pivotally coupled to said second pivot axis; and a latching member coupled to and pivotable with said leg member for releasably engaging detent means on said tray.

11. Apparatus as defined by claim 10 wherein said latching means further comprises a spring coupled between said tray and said leg member for normally biasing said tray toward said receiving position and for normally biasing said leg member toward said tray.

12. Apparatus as defined by claim 11 wherein said latching member comprises a stub extending from said leg member and having a first cammed portion; and wherein said detent means comprises a member depending from said tray and having a first cammed portion, said stub being normally positioned in the path of said depending member, such that said first cammed portion of said depending member contacts said first cammed portion of said stub when said tray is pivoted from its receiving position to its operative position to thereby pivot said leg member away from the path of said depending member until said first cammed portion of said depending member clears said first cammed portion of said stub, to permit the spring bias to pivot said leg member to urge said stub into locking relation with said depending member.

13. Apparatus as defined by claim 12 wherein said stub includes a second cammed portion and said depending member includes a second cammed portion; and further comprising a manually operable lever coupled to said leg member for pivoting said leg member such that said second cammed portion of said stub rides along said second cammed portion of said depending member until said stub releases said depending member to permit the spring bias to pivot said tray to its receiving position.

14. Apparatus as defined by claim 11 and further comprising means coupled to said tray for limiting the pivotal movement thereof and thereby define said receiving position.

15. Apparatus as defined by claim 14 wherein said limiting means comprises a member pivotable about a third pivot axis and having a first leg portion movable with said tray to pivot said member about said second axis, and a third leg portion adapted to contact a stop to thereby restrain further pivotal movement of said member and said tray.

16. Apparatus as defined by claim 15 wherein said tray includes a pin upon which said first leg portion rides; and means for spring biasing said member to maintain said first leg portion in contact with said pin.

17. Apparatus as defined by claim 9 wherein said pivotable support member comprises a first bridge member having a cross-piece upon which said head is mounted and legs depending from said cross-piece and journalled for rotation about a fixed pivot rod; and said latching means comprises a second bridge member having a cross-piece and legs depending therefrom and journalled for rotation about said fixed pivot rod, said second bridge member cross-piece having an erase head mounted thereon; said second bridge member further including a latching member for releasably engaging detent means on said tray, and a spring coupled between said second bridge member and said tray for normally biasing said bridge member toward said tray and for normally biasing said tray toward said receiving position.

18. Apparatus as defined by claim 17 wherein said second bridge member includes a projecting member for contacting said tray in the event that said tray does not pivot toward said receiving position when said latching member releases said detent means.

* * * * *

UNITED STATES PATENT AND TRADEMARK OFFICE
CERTIFICATE OF CORRECTION

PATENT NO. : 4,056,835
DATED : November 1, 1977
INVENTOR(S) : James C. Whitney et al It is certified that error appears in the above-identified patent and that said Letters Patent are hereby corrected as shown below:

Column 14, Claim 15, line 15, change "second" to -- third --.
Column 14, Claim 15, line 16, change "third" to -- second --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks